(12) United States Patent
Lin et al.

(10) Patent No.: US 12,286,371 B2
(45) Date of Patent: Apr. 29, 2025

(54) EMERGENCY TREATMENT EQUIPMENT AND METHOD FOR ALGAL BLOOMS IN RESERVOIR TRIBUTARIES AND BAYS

(71) Applicant: Changjiang River Scientific Research Institute, Hubei (CN)

(72) Inventors: Li Lin, Hubei (CN); Zhigui Sha, Hubei (CN); Qingyun Li, Hubei (CN); Xianqiang Tang, Hubei (CN); Wei Zhang, Hubei (CN); Liangyuan Zhao, Hubei (CN); Zhenhua Wang, Hubei (CN); Meng Long, Hubei (CN); Lei Dong, Hubei (CN); Xiaohuan Cao, Hubei (CN); Huan Li, Hubei (CN)

(73) Assignee: Changjiang River Scientific Research Institute, Hubei (CN)

( * ) Notice: Subject to any disclaimer, the term of this patent is extended or adjusted under 35 U.S.C. 154(b) by 459 days.

(21) Appl. No.: 17/829,212

(22) Filed: May 31, 2022

(65) Prior Publication Data
US 2022/0306507 A1    Sep. 29, 2022

(30) Foreign Application Priority Data
Oct. 14, 2021    (CN) .......................... 202111200274.1

(51) Int. Cl.
*C02F 9/00*    (2023.01)
*C02F 1/00*    (2023.01)
(Continued)

(52) U.S. Cl.
CPC ................ *C02F 9/00* (2013.01); *C02F 1/008* (2013.01); *C02F 1/004* (2013.01); *C02F 1/36* (2013.01);
(Continued)

(58) Field of Classification Search
None
See application file for complete search history.

(56) References Cited

U.S. PATENT DOCUMENTS

| 2005/0023054 A1* | 2/2005 | Weidenheimer | F41B 6/00 180/65.25 |
| 2013/0228464 A1* | 9/2013 | Eckelberry | C02F 1/463 204/671 |
| 2021/0347662 A1* | 11/2021 | Landau | C02F 1/283 |

FOREIGN PATENT DOCUMENTS

| CN | 103129713 B | * | 1/2016 |
| CN | 109502705 A | * | 3/2019 |
| KR | 1020160031766 | * | 3/2016 |

OTHER PUBLICATIONS

MT of CN103129713 (Year: 2016).*
MT KR1020160031766 (Year: 2016).*
MT CN 109502705 (Year: 2019).*

* cited by examiner

*Primary Examiner* — Peter Keyworth

(57) ABSTRACT

An emergency treatment device for algal blooms in reservoir tributaries and bays includes a hull, an automatic detection unit provided on the hull, an algae collection-separation unit, an ultrasonic algae removal unit, a micro-current electrolytic algae suppression unit, an algaecide adding unit, a power unit and a control unit. The automatic detection unit, the algae collection-separation unit, the ultrasonic algae removal unit, the micro-current electrolytic algae suppression unit, the algaecide adding unit and the power unit are connected with the control unit. The algae collection-separation unit is used for suction and ex-situ treatment of high-density algae on a surface of the water body. The ultrasonic algae removal unit, the micro-current electrolytic (Continued)

algae suppression unit and the algaecide adding unit are used for in-situ treatment of algae in the water body.

6 Claims, 2 Drawing Sheets

(51) Int. Cl.
    *C02F 1/36*         (2023.01)
    *C02F 1/463*       (2023.01)
    *C02F 1/467*       (2023.01)
    *C02F 1/50*         (2023.01)
    *C02F 1/52*         (2023.01)
    *C02F 103/00*      (2006.01)

(52) U.S. Cl.
    CPC ............ *C02F 1/463* (2013.01); *C02F 1/4672* (2013.01); *C02F 1/50* (2013.01); *C02F 1/5236* (2013.01); *C02F 2103/007* (2013.01); *C02F 2201/008* (2013.01); *C02F 2305/023* (2013.01)

EMERGENCY TREATMENT EQUIPMENT AND METHOD FOR ALGAL BLOOMS IN RESERVOIR TRIBUTARIES AND BAYS

CROSS REFERENCE OF RELATED APPLICATION

The present invention claims priority under 35 U.S.C. 119(a-d) to CN 202111200274.1, filed Oct. 14, 2021.

BACKGROUND OF THE PRESENT INVENTION

Field of Invention

The present invention relates to the field of environmental protection technology, and more particularly to an emergency treatment device and an emergency treatment method for algal blooms in reservoir tributaries and bays.

Description of Related Arts

China is the country with the largest number of reservoirs in the world. According to statistics, the total number of reservoirs in China in 2019 was 98,112, including 93,390 small reservoirs, 3,978 medium reservoirs and 744 large reservoirs. The operation of the reservoir is able to provide sustainable clean energy for social and economic development, and play huge comprehensive benefits in flood control, shipping, power generation, water supply, etc. The development, construction and operation of world-class giant cascade hydropower stations such as Three Gorges Project, Xiluodu, Xiangjiaba, Wudongde, and Baihetan, play an important role in guaranteeing watershed flood control safety, shipping security, water supply security, ecological security and China's energy security. However, the operation of the reservoir will change the hydraulic conditions around the reservoir to a certain extent, resulting in the increase in the water level, the slowdown in the flow rate, the worsening of the hydrodynamic conditions, the weakening of the self-purification ability of the water body, and the easy accumulation of pollutants of the reservoir tributary and bay, so that the water environment of the reservoir changes. At the same time, the continuous input of a large amount of nutrients in the tributaries and the backwater area of the reservoir will lead to aggravation of eutrophication of local water bodies, so that under suitable hydrological and meteorological conditions, algal blooms will occur and there is a risk of algal blooms. Reservoir blooms greatly threaten the health of human beings and aquatic organisms, and at the same time cause great harm to the aquatic ecological environment. Therefore, it is urgent and important for reservoirs to solve the problem of algal blooms.

At present, there are many studies on the algal bloom control technology and the emergency treatment device. Different technologies have their own advantages and disadvantages, and different treatment devices also have their own characteristics, but most of the devices adopt a single treatment technology. Most of the emergency treatment devices for algal blooms are based on the physical salvage method. These devices have a certain treatment effect on high-density algae-containing water bodies, but have poor treatment effect on low-density algae-containing water bodies and bottom algae in water bodies, and also require a lot of human and material resources. Commonly used emergency treatment devices have problems such as low treatment efficiency and insufficient coordination of different treatment technologies. In addition, the currently commonly used emergency treatment devices are mostly used for algal bloom control in shallow lakes. Due to great differences between reservoirs and lakes in water body shape, hydrodynamic characteristics and water temperature stratification, the tributaries and bays of reservoirs have the characteristics of large water depth and hydrodynamic properties, there is a big difference between the algal blooms in reservoirs and those in shallow lakes. As a result, the device for algal bloom control in shallow lakes is difficult to achieve the desired effect when controlling algal blooms in reservoirs.

The Chinese invention patent with an application number CN 201310731039.6, titled as "Salvage device and salvage method for algae blooms", discloses a salvage device and a salvage method for algae blooms. The application is to directly salvage algae from the water body by a mechanical method. However, it requires a lot of human and material resources, and at the same time, it is low in treatment efficiency and is poor in the treatment effect of low-density algae-containing water bodies and bottom algae in water bodies.

The Chinese invention patent with an application number CN 200910213580.1, titled as "Ultrasonic algae removal vessel for emergency treatment of algal blooms", discloses an ultrasonic algae removal vessel for emergency treatment of algal blooms, which is applied to emergency treatment of lake blooms. In this application, the ultrasonic algae removal device is installed on the ship, and algae cells in water are broken by ultrasonic waves, so as to achieve the purpose of killing algae. However, ultrasonic algae killing process only breaks the algae cells. If the algae cells are not completely killed, the algal blooms will occur again, and then it is necessary to combine other treatment processes to sink the algae into the water body to achieve a better treatment effect. At the same time, because the energy of ultrasonic waves decays very quickly during the propagation process, it is difficult to have a sustained effect on a large range of algal cells. In addition, once the ultrasonic radiation is over, the killing effect on algae will stop immediately, and the effect of continuous algae suppression is unable to be achieved, and it is difficult to achieve an ideal treatment effect.

In the process of realizing the present invention, the inventors of the present application have found through research that: the tributaries and bays of the reservoirs have the characteristics of large water depth, uneven vertical distribution of algae, and the coexistence of a variety of algae during blooms. For the treatment of algal blooms in reservoirs, a single treatment technology is no longer able to meet the actual needs. It is necessary to adopt multi-technology integration to give full play to the advantages of various technologies and the synergy between technologies. In view of the complex hydrodynamic conditions and the large changes in water quality of the reservoirs, it is also necessary to optimize and integrate various technologies according to local conditions, so that through the synergy between technologies, the dual purpose of controlling algal blooms and long-term algae control is achieved.

SUMMARY OF THE PRESENT INVENTION

An object of the present invention is to provide an emergency treatment device and an emergency treatment method for algal blooms in reservoir tributaries and bays in view of the deficiencies of existing emergency treatment devices for algal blooms. The emergency treatment device provided by the present invention is formed by integrating multi-processing technology units. According to the characteristics of algal blooms in reservoir tributaries and bays, the present invention adopts a combination of various technologies and exerts the synergistic effect of the technologies to achieve the dual purpose of controlling algal blooms and long-term algae control.

An emergency treatment device for algal blooms in reservoir tributaries and bays comprises a hull, an automatic detection unit provided on the hull, an algae collection-separation unit, an ultrasonic algae removal unit, a micro-current electrolytic algae suppression unit, an algaecide adding unit, a power unit and a control unit, wherein:

the automatic detection unit, the algae collection-separation unit, the ultrasonic algae removal unit, the micro-current electrolytic algae suppression unit, the algaecide adding unit and the power unit are connected with the control unit;

the power unit is configured to provide power to make the hull run on a water surface, and the automatic detection unit is configured to perform real-time monitoring and feedback on a water quality of a water body, and determine an algae treatment load in a target area by monitored data;

the algae collection-separation unit is used for suction and ex-situ treatment of high-density algae on a surface of the water body;

the ultrasonic algae removal unit, the micro-current electrolytic algae suppression unit and the algaecide adding unit are used for in-situ treatment of algae in the water body.

Preferably, the automatic detection unit is provided at a bottom of the hull and has functions of water quality monitoring, data collection and data transmission, which is able to be achieved by a multi-parameter water quality monitor.

Preferably, the algae collection-separation unit comprises an algae suction device, an algae concentration device, an algae suction pump and an algae cake recycling box, wherein the algae suction device is connected with a front end of the algae concentration device through a pipeline, a rear end of the algae concentration device is connected with the algae cake recycling box, so that the algae suction device, the algae concentration device, and the algae cake recycling box are connected with each other in sequence to complete a collection-concentration-recovery operation of high-density algae.

Preferably, the algae on the surface of the water body is sucked by the algae suction device through the algae suction pump, and then is discharged into the algae concentration device, and then algae pulp is obtained by primary separation through electroflocculation technology with the algae concentration device, and then algae cakes are obtained by secondary separation through graphene microflocculation algae water separation technology or belt filter press technology, and then the algae cakes enter the algae cake recycling box, the treated water is discharged to the water body, so as to realize collection and separation of the high-density algae on the surface of the water body.

Preferably, the ultrasonic algae removal unit comprises an ultrasonic electric control cabinet and an ultrasonic probe connected with the ultrasonic electric control cabinet, wherein a power generation cabin is configured to provide power for the ultrasonic algae removal unit, the ultrasonic probe extends into the water body, the ultrasonic algae removal unit radiates ultrasonic waves at a specific frequency during operation, and instantly treats algal cells in the water body to break the algal cells by the ultrasonic waves, so that the algal cells are unable to perform photosynthesis and lose a reproductive ability, thereby achieving a purpose of killing algae.

Preferably, the micro-current electrolytic algae suppression unit comprises two micro-current electrolysis electrode plates and is powered by the power generation cabin, wherein during operation, the micro-current electrolysis electrode plates extend into the water body, one of the electrode plates is embodied as a carbon black-polytetrafluoroethylene gas diffusion electrode and acts as a cathode, which is beneficial to produce a large number of active substances $H_2O_2$ with a long half-life and selective inhibitory effect on algae, so as to continuously inhibit a growth of residual algal cells in the water body after ultrasonic treatment.

Preferably, algaecide is added by the algaecide adding unit in a form of pump spraying.

Preferably, the algaecide is compounded by lanthanum-modified bentonite and a microbial agent, wherein through a combined action of the microbial agent and lanthanum-modified bentonite, the broken algal cells after ultrasonic treatment are sunk into a bottom of the water body to avoid recurrence of the algal blooms.

Preferably, the power unit is embodied as an oil-electric hybrid power.

Also, the present invention provides an emergency treatment method for algal blooms in reservoir tributaries and bays, which is achieved by the above-mentioned emergency treatment device. The emergency treatment method comprises steps of:

(1) monitoring a water quality of a water body by the automatic detection unit, determining a concentration of chlorophyll a in the water body, determining an algae treatment load in a target area based on the concentration and an action area, performing parameter setting by transmitting relevant parameters to the control unit, and predicting a time required for algae disposal in the target area;

(2) performing ex-situ treatment on high-density algae-containing water body on a surface of the water body by the algae collection-separation unit, which comprises collecting the high-density algae-containing water body on the surface of the water body by the algae suction pump and then discharging into the algae concentration device, obtaining algae pulp by primary separation through electroflocculation technology with the algae concentration device, obtaining algae cakes by secondary separation through graphene microflocculation algae water separation technology or belt filter press technology, discharging the algae cakes into the algae cake recycling box, and discharging the treated water to the water body, so as to realize collection and separation of high-density algae on the surface of the water body; and (3) performing in-situ treatment on low-density algae-containing water body at middle and lower layers of the water body by the ultrasonic algae removal unit, the micro-current electrolytic algae suppression unit and the algaecide adding unit, which comprises:

when the ultrasonic algae removal unit is working, directly putting the ultrasonic probe into the water body, the ultrasonic probe irradiating ultrasonic waves at a specific frequency for instantly treating algal cells in the water body, breaking the algal cells by the ultrasonic waves, so that the algal cells are unable to perform photosynthesis and lose a reproductive ability, so as to achieve a purpose of killing algae;

when the micro-current electrolytic algae suppression unit is working, putting the micro-current electrolysis electrode plates into the water body, wherein one of the electrode plates is embodied as a carbon black-polytetrafluoroethylene gas diffusion electrode and acts as a cathode, which is beneficial to produce a large number of active substances $H_2O_2$ with a long half-life and selective inhibitory effect on algae, so as to continuously inhibit a growth of residual algal cells in the water body after ultrasonic treatment;

adding algaecide by the algaecide adding unit in a form of pump spraying, wherein the algaecide is compounded by lanthanum-modified bentonite and a microbial agent, so that under a combined action of the microbial agent and lanthanum-modified bentonite, recurrence of algal blooms is effectively avoided while removing algae from the water body.

According to the preferred embodiment of the present invention, the automatic detection unit, the algae collection-separation unit, the ultrasonic algae removal unit, the micro-current electrolytic algae suppression unit and the algaecide adding unit are integrated with the hull. The algae collection-separation unit installed on the hull is used for suction and ex-situ treatment of high-density algae on the surface of the water body. The ultrasonic algae removal unit, the micro-current electrolytic algae suppression unit and the algaecide adding unit are used for in-situ treatment of low-density algae at middle and lower layers of the water body. As a result, the water body is quickly and efficiently purified, the algae density in the bloom area rapidly decreases, and at the same time, the present invention has characteristics of convenience and flexibility, wide application range, simple management, and easy promotion and implementation.

Figure 1:
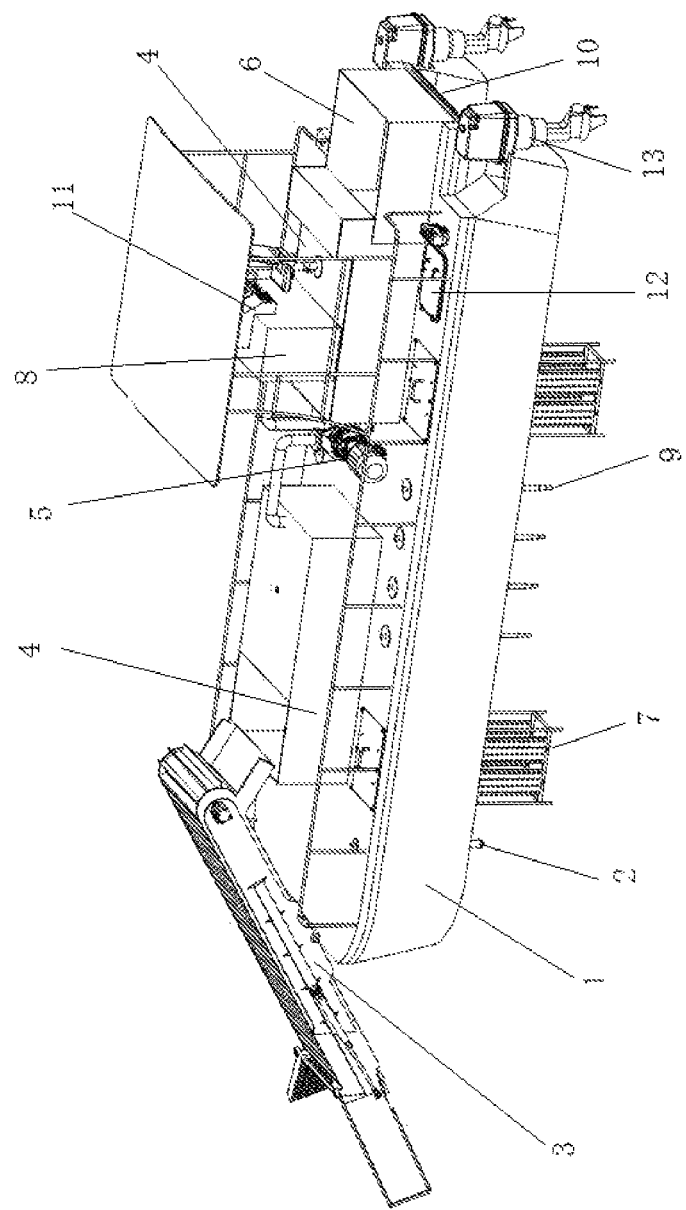
FIG. 1 is a structural schematic diagram of an emergency treatment device for algal blooms in reservoir tributaries and bays provided by the present invention.

In the drawings, 1: hull; 2: automatic detection unit; 3: algae suction device; 4: algae concentration device; 5: algae suction pump; 6: algae cake recycling box; 7: micro-current electrolytic algae suppression unit; 8: ultrasonic electric control cabinet; 9: ultrasonic probe; 10: algaecide adding unit; 11: driving console; 12: power generation cabin; 13: thruster.

DETAILED DESCRIPTION OF THE PREFERRED EMBODIMENT

In order to make the purposes, technical solutions and advantages of the embodiments of the present invention clearer, the technical solutions in the embodiments of the present invention will be clearly and completely described with accompanying drawings as follows. Obviously, the described embodiments are some but not all embodiments of the present invention. Based on the embodiments of the present invention, all other embodiments obtained by those skilled in the art without creative work shall fall within the protection scope of the present invention.

Referring to FIG. 1, an emergency treatment device for algal blooms in reservoir tributaries and bays according to a preferred embodiment of the present invention is illustrated.

The emergency treatment device comprises a hull 1, an automatic detection unit 2 provided on the hull 1, an algae collection-separation unit, an ultrasonic algae removal unit, a micro-current electrolytic algae suppression unit 7, an algaecide adding unit 10, a power unit and a control unit, wherein the automatic detection unit 2, the algae collection-separation unit, the ultrasonic algae removal unit, the micro-current electrolytic algae suppression unit 7, the algaecide adding unit 10 and the power unit are connected with the control unit.

The automatic detection unit 2 is provided at a bottom of the hull 1 and has functions of water quality monitoring, data collection and data transmission, which is able to be achieved by commercially available multi-parameter water quality monitors. The automatic detection unit 2 is used to perform real-time monitoring and feedback on the water quality (which is mainly chlorophyll a), and to determine the algal treatment load in a target area (such as time required for operation) by monitored data (such as concentration of chlorophyll a).

The algae collection-separation unit comprises an algae suction device 3, an algae concentration device 4, an algae suction pump 5 and an algae cake recycling box 6, wherein the algae suction device 3 is connected with a front end of the algae concentration device 4 through a pipeline, a rear end of the algae concentration device 4 is connected with the algae cake recycling box 6, so that the algae suction device, the algae concentration device, and the algae cake recycling box are connected with each other in sequence to complete the collection-concentration-recovery operation of high-density algae. The algae on the surface of the water body is sucked by the algae suction device 3 through the algae suction pump 5 and then is discharged into the algae concentration device 4, and then algae pulp is obtained by primary separation through electroflocculation technology with the algae concentration device 4, and then algae cakes are obtained by secondary separation through graphene microflocculation algae water separation technology or belt filter press technology, and then the algae cakes enter the algae cake recycling box 6, the treated water is discharged to the water body, so as to realize collection and separation of high-density algae on the surface of the water body.

The ultrasonic algae removal unit comprises an ultrasonic electric control cabinet 8 and an ultrasonic probe 9 connected with the ultrasonic electric control cabinet 8. A power generation cabin 12 provides power for the ultrasonic algae removal unit, the ultrasonic probe 9 extends into the water body, the ultrasonic algae removal unit instantly treats algal cells in the water body by radiating ultrasonic waves at a specific frequency during operation, and breaks the algal cells by the ultrasonic waves, so that the algal cells are unable to perform photosynthesis and lose the reproductive ability, thereby achieving the purpose of killing algae.

The micro-current electrolytic algae suppression unit 7 comprises two micro-current electrolysis electrode plates and is powered by the power generation cabin 12. When working, the micro-current electrolysis electrode plates extend into the water body, one of the electrode plates is embodied as a carbon black-polytetrafluoroethylene gas diffusion electrode and acts as a cathode, which is beneficial to produce a large number of active substances $H_2O_2$ with a long half-life and selective inhibitory effect on algae, so as to continuously inhibit the growth of residual algal cells in the water body after ultrasonic treatment.

The algaecide is added by the algaecide adding unit 10 in a form of pump spraying. Under the combined action of a microbial agent and lanthanum modified bentonite, the broken algal cells after ultrasonic treatment are sunk into the bottom of the water body to avoid the recurrence of algal blooms.

The power unit is embodied as an oil-electric hybrid power, which makes full use of the rotational energy generated by an engine in the working process to reduce fuel consumption and possible environmental pollution risks.

The control unit is integrated into a driving console 11 of the hull 1 for control the work of the aforementioned modules.

According to the preferred embodiment of the present invention, the automatic detection unit 2, the algae collection-separation unit, the ultrasonic algae removal unit, the micro-current electrolytic algae suppression unit 7 and the algaecide adding unit 10 are integrated with the hull 1, so that the outbreak of algal blooms in the reservoir tributaries and bays is able to be managed collaboratively by both ex-situ and in-situ treatment technologies.

Specifically, the hull 1 relies on its own power generation cabin 12 to provide power for the power unit (such as a thruster 13) to run on the water, and all processing units on the ship are also powered by the power generation cabin 12. The automatic detection unit 2 installed on the hull 1 is configured to perform real-time monitoring and feedback on the water quality of the water body. The algae collection-separation unit installed on the hull 1 is used for suction and ex-situ treatment of high-density algae on the surface of the water body. The ultrasonic algae removal unit, the micro-current electrolytic algae suppression unit 7 and the algaecide adding unit 10 installed on the hull 1 are used for in-situ treatment of low-density algae in middle and lower layers of the water body. The active substances with long half-life are released through the micro-current electrolysis technology, diffuse freely in the water body, and endow the water body with the ability to continuously inhibit algae, thereby realizing the continuous algae inhibition after the end of ultrasonic waves. Moreover, aiming at the problem of algal cell rupture caused by ultrasonic algae removal, the algae in the water body is removed in depth through combining with the algaecide adding unit 10, so as to further reduce the harm caused by algal blooms, thus achieving the effect of quickly and efficiently purifying the water body. The emergency treatment device provided by the present invention is able to be widely used in emergency treatment of algal blooms in the reservoir tributaries and bays, and has good flexibility and practicability.

Figure 2:
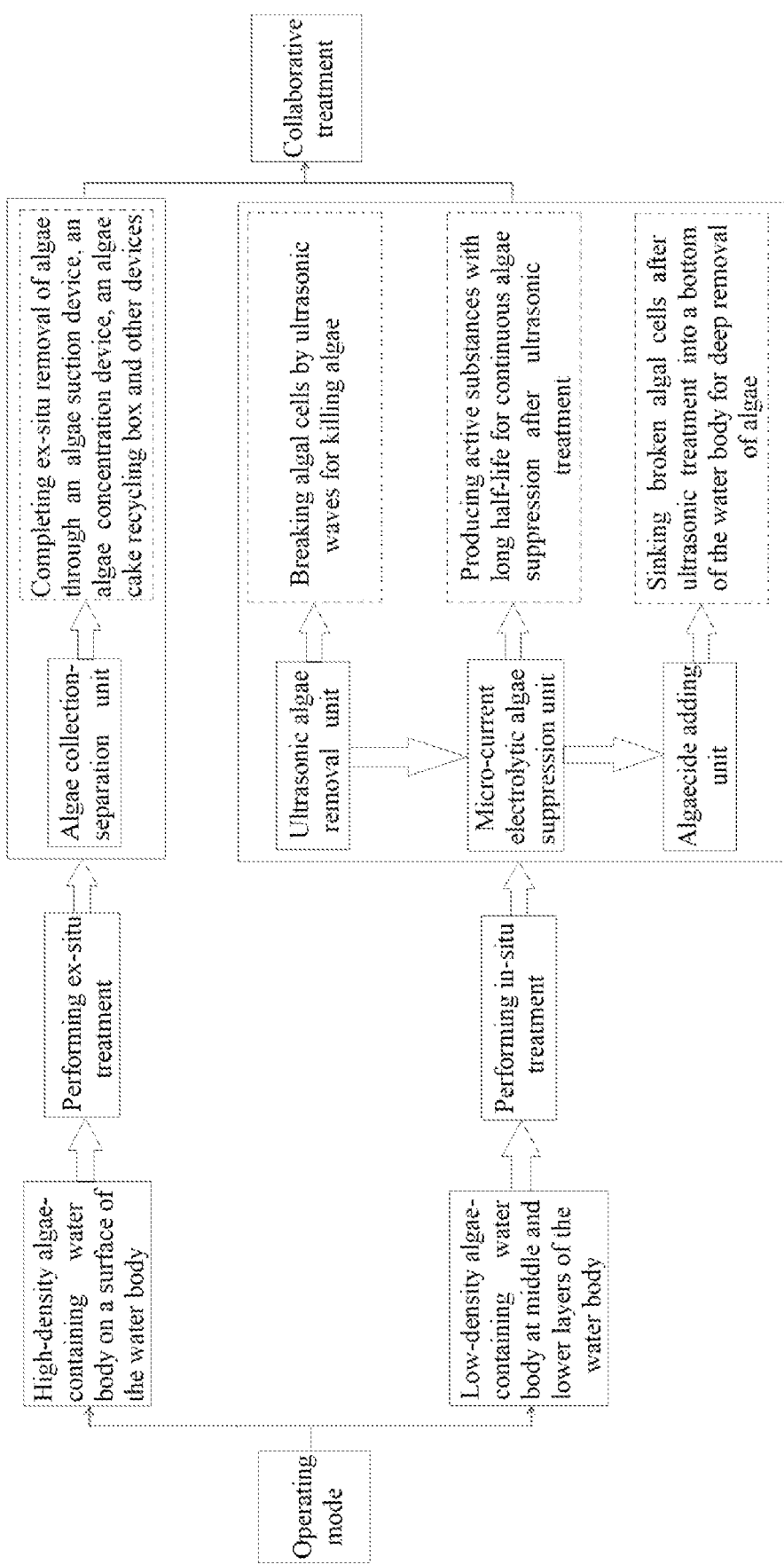
FIG. 2 is a schematic diagram of working principle of an emergency treatment method for algal blooms in reservoir tributaries and bays provided by the present invention.

Referring to FIG. 2, an emergency treatment method for algal blooms in reservoir tributaries and bays is illustrated, wherein the emergency treatment method is achieved by the above emergency treatment device. The method comprises steps of:

(1) monitoring a water quality (mainly chlorophyll a) of a water body by the automatic detection unit 2, determining a concentration of chlorophyll a in the water body, determining an algae treatment load in a target area based on the concentration and an action area, performing parameter setting by transmitting relevant parameters to the control unit, and predicting a time required for algae disposal operation in the target area by combining with a processing capacity of the emergency treatment device;

(2) performing ex-situ treatment on a high-density algae-containing water body on a surface of the water body by the algae collection-separation unit, which comprises collecting the high-density algae-containing water body on the surface of the water body by the algae suction pump 5 and then discharging into the algae concentration device 4, obtaining algae pulp by primary separation through electroflocculation technology with the algae concentration device 4, obtaining algae cakes by secondary separation through graphene microflocculation algae water separation technology or belt filter press technology, discharging the algae cakes into the algae cake recycling box 6, and discharging the treated water to the water body, so as to realize collection and separation of high-density algae on the surface of the water body; and (3) performing in-situ treatment on low-density algae-containing water body at middle and lower layers of the water body by the ultrasonic algae removal unit, the micro-current electrolytic algae suppression unit and the algaecide adding unit, which comprises:

when the ultrasonic algae removal unit is working, directly putting the ultrasonic probe 9 into the water body for 0.5 m, the ultrasonic probe 9 irradiating ultrasonic waves at a specific frequency for instantly treating algal cells in the water body, breaking the algal cells by the ultrasonic waves, so that the algal cells are unable to perform photosynthesis and lose a reproductive ability, so as to achieve a purpose of killing algae;

when the micro-current electrolytic algae suppression unit is working, putting the micro-current electrolysis electrode plates into the water body, wherein one of the electrode plates is embodied as a carbon black-polytetrafluoroethylene gas diffusion electrode and acts as a cathode, which is beneficial to produce a large number of active substances $H_2O_2$ with a long half-life and selective inhibitory effect on algae, so as to continuously inhibit a growth of residual algal cells in the water body after ultrasonic treatment;

adding algaecide by the algaecide adding unit in a form of pump spraying, wherein the algaecide is compounded by lanthanum-modified bentonite and a microbial agent with a mass ratio of 200:1, so that under a combined action of the microbial agent and lanthanum-modified bentonite, recurrence of algal blooms is effectively avoided while removing algae from the water body.

According to the preferred embodiment of the present invention, the automatic detection unit 2, the algae collection-separation unit, the ultrasonic algae removal unit, the micro-current electrolytic algae suppression unit 7 and the algaecide adding unit 10 are integrated with the hull 1. The outbreak of algal blooms and different algal density distributions in the reservoir tributaries and bays is able to be managed collaboratively by both ex-situ and in-situ treatment technologies. The algae collection-separation unit is used for suction and ex-situ treatment of high-density algae on the surface of the water body. The ultrasonic algae removal unit, the micro-current electrolytic algae suppression unit 7 and the algaecide adding unit 10 are used for in-situ treatment of low-density algae at middle and lower layers of the water body. The ultrasonic probe which extends into the water irradiates the ultrasonic waves, and the algal cells are broken by ultrasonic cavitation. Aiming at the problem that the ultrasonic waves are unable to continuously inhibit the algae, the active substances with long half-life are released into the water body through micro-current electrolysis, diffuse freely in the water body, and endow the water body with the ability to continuously inhibit the algae, so as to realize the continuous algae inhibition effect after the end of the ultrasonic waves, thereby achieving the synergistic effect of the ultrasonic algae removal unit and the micro-current electrolytic algae suppression unit. In view of the problem of algal cell rupture caused by ultrasonic algae removal, combined with the algaecide adding unit, the broken algal cells are sunk into the bottom of the water body, and the algae in the water body are deeply removed to avoid the recurrence of algae blooms and further reduce the harm caused by algae blooms. The present invention achieves the effect of "1+1>2" by exerting the synergistic effect of multi-processing technologies, and realizes the treatment of water blooms.

Finally, it should be noted that the above embodiments are only specific implementations of the present invention, but the protection scope of the present invention is not limited thereto. Modifications or equivalent replacements without departing from the spirit and scope of the technical solutions of the present invention shall be included in the scope of the claims of the present invention. Therefore, the protection scope of the present invention should be subject to the protection scope of the claims.

What is claimed is:

1. An emergency treatment device for algal blooms in reservoir tributaries and bays, the emergency treatment device comprising a hull, an automatic detection unit provided on the hull, an algae collection-separation unit, an ultrasonic algae removal unit, a micro-current electrolytic algae suppression unit, an algaecide adding unit, a power unit and a control unit, wherein:
   the automatic detection unit, the algae collection-separation unit, the ultrasonic algae removal unit, the micro-current electrolytic algae suppression unit, the algaecide adding unit and the power unit are connected with the control unit;
   the power unit is configured to provide power to make the hull run on a water surface, and the automatic detection unit is configured to perform real-time monitoring and feedback on a water quality of a water body, and determine an algae treatment load in a target area by monitored data;
   the algae collection-separation unit is used for suction and ex-situ treatment of high-density algae on a surface of the water body;
   the ultrasonic algae removal unit, the micro-current electrolytic algae suppression unit and the algaecide adding unit are used for in-situ treatment of algae in the water body;
   algaecide is added by the algaecide adding unit in a form of pump spraying;
   the algaecide is compounded by lanthanum-modified bentonite and a microbial agent, wherein through a combined action of the microbial agent and lanthanum-modified bentonite, broken algal cells after ultrasonic treatment are sunk into a bottom of the water body to avoid recurrence of the algal blooms.

2. The emergency treatment device according to claim 1, wherein the automatic detection unit is provided at a bottom of the hull and has functions of water quality monitoring, data collection and data transmission, which is able to be achieved by a multi-parameter water quality monitor.

3. The emergency treatment device according to claim 2, wherein the algae collection-separation unit comprises an algae suction device, an algae concentration device, an algae suction pump and an algae cake recycling box, wherein the algae suction device is connected with a front end of the algae concentration device through a pipeline, a rear end of the algae concentration device is connected with the algae cake recycling box, so that the algae suction device, the algae concentration device, and the algae cake recycling box are connected with each other in sequence to complete a collection-concentration-recovery operation of high-density algae.

4. The emergency treatment device according to claim 3, wherein the ultrasonic algae removal unit comprises an ultrasonic electric control cabinet and an ultrasonic probe connected with the ultrasonic electric control cabinet, wherein a power generation cabin is configured to provide power for the ultrasonic algae removal unit, the ultrasonic probe extends into the water body, the ultrasonic algae removal unit radiates ultrasonic waves at a specific frequency during operation, and instantly treats algal cells in the water body to break the algal cells by the ultrasonic waves, so that the algal cells are unable to perform photosynthesis and lose a reproductive ability, thereby achieving a purpose of killing algae.

5. The emergency treatment device according to claim 4, wherein the micro-current electrolytic algae suppression unit comprises two micro-current electrolysis electrode plates and is powered by a power generation cabin, wherein during operation, the micro-current electrolysis electrode plates extend into the water body, one of the electrode plates is embodied as a carbon black-polytetrafluoroethylene gas diffusion electrode and acts as a cathode, which is beneficial to produce a large number of active substances with a long half-life and selective inhibitory effect on algae, so as to continuously inhibit a growth of residual algal cells in the water body after ultrasonic treatment.

6. The emergency treatment device according to claim 5, wherein the power unit is embodied as an oil-electric hybrid power.

* * * * *